(12) United States Patent
Wu et al.

(10) Patent No.: US 8,929,328 B2
(45) Date of Patent: Jan. 6, 2015

(54) DECOUPLING SCANNING FROM HANDOFF FOR REDUCED DELAY OVER WIRELESS LAN

(75) Inventors: Haitao Wu, Redmond, WA (US); Kun Tan, Redmond, WA (US); Yongguang Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1673 days.

(21) Appl. No.: 11/701,897

(22) Filed: Feb. 2, 2007

(65) Prior Publication Data

US 2008/0186917 A1 Aug. 7, 2008

(51) Int. Cl.
*H04W 4/00* (2009.01)
*H04W 36/10* (2009.01)
*H04W 48/16* (2009.01)

(52) U.S. Cl.
CPC .............. *H04W 36/10* (2013.01); *H04W 48/16* (2013.01)
USPC ............................. 370/331; 370/338; 455/436

(58) Field of Classification Search
USPC .................. 370/466, 332, 330, 346, 338, 328
See application file for complete search history.

(56) References Cited

U.S. PATENT DOCUMENTS

| | | | |
|---|---|---|---|
| 5,678,184 A | 10/1997 | Cutler et al. | |
| 7,313,113 B1 * | 12/2007 | Hills et al. | 370/330 |
| 2002/0102977 A1 | 8/2002 | Shi | |
| 2005/0025182 A1 * | 2/2005 | Nazari | 370/469 |
| 2005/0091357 A1 | 4/2005 | Krantz et al. | |
| 2006/0002342 A1 | 1/2006 | Lin | |
| 2006/0025127 A1 * | 2/2006 | Cromer et al. | 455/432.1 |
| 2006/0153151 A1 * | 7/2006 | Huang et al. | 370/338 |
| 2006/0187873 A1 * | 8/2006 | Friday et al. | 370/328 |
| 2007/0064655 A1 * | 3/2007 | Ruuska | 370/332 |
| 2008/0062942 A1 * | 3/2008 | Hills et al. | 370/338 |

FOREIGN PATENT DOCUMENTS

KR 10-2005-0072966 A 7/2005

OTHER PUBLICATIONS

International Search Report for related European case, Sep. 21, 2009.
Mishra, A., Shin, M., and Arbaugh, W. 2003. An empirical analysis of the IEEE 802.11 MAC layer handoff process. *SIGCOMM Comput. Commun. Rev.* 33, 2 (Apr. 2003), 93-102.
Supplementary European Search Report, Application No. EP08872427, mailed Feb. 10, 2014.
Wu, et al., "Proactive Scan: Fast Handoff with Smart Triggers for 802.11 Wireless LAN", published in IEEE Infocom 2007 Proceedings, May 2007, 9 pages.
China Final Rejection, Application No. 200880003846.3, mailed Jan. 30, 2014.

(Continued)

*Primary Examiner* — German J Viana Di Prisco
(74) *Attorney, Agent, or Firm* — John Jardine; Kate Drakos; Micky Minhas

(57) ABSTRACT

Methods and systems for handing off a wireless client between access points wherein the scanning for access points is decoupled from the handing off, thus reducing the delay in handing off. Channel scan delay may be eliminated or reduced in some embodiments by scanning early (prior to actual handoff) and interleaving the channel scan with ongoing traffic in a non-intrusive way. A smart handoff trigger may be used in some embodiments that covers both uplink and downlink quality, and addresses link asymmetry problems. The methods or systems may be implemented in some embodiments in a software-only client-only solution without the need to modify the networks themselves or their access points.

18 Claims, 14 Drawing Sheets

(56) References Cited

OTHER PUBLICATIONS

"Wireless LAN Medium Access Control (MAC) and Physical Layer (PHY) Specifications", ANS/IEEE Std 802.11, 1999 edition, Aug. 20, 1999, Institute of Electrical and Electronics Engineers, Inc., New York, NY, USA, 528 pages.

Crow, et al., "IEEE 802.11—Wireless Local Area Networks", IEEE Communications Magazine, Sep. 1997, 11 pages.

"IEEE Trial-Use Recommended Practice for Multi-Vendor Access Point Interoperability via an Inter-Access Point Protocol Across Distribution Systems Supporting IEEE 802.11 Operation", IEEE Computer Society, Jul. 14, 2003, IEEE Std 802.11, 78 pages.

Bargh, et al., "Fast Authentication Methods for Handovers between IEEE 802.11 Wireless LANs", in Proc. of WMASH 2004, Oct. 1, 2001, Philadelphia, USA, 11 pages.

Mhatre, V. And Papagiannaki, K., "Using Smart Triggers for Improved User Performance in 802.11 Wireless Networks", MobiSys 2006, 14 pages.

Mishra, et al., "Context Caching using Neighbor Graphs for Fast Handoff in a Wireless Network", IEEE Infocom 2004, 11 pages.

Kim, et al "Selective Channel Scanning for Fast Handoff in Wireless LAN using Neighbor Graph", ITC-CSCC, 2004, 4 pages.

Pack, et al., "SNC: A Selective Neighbor Caching Scheme for Fast Handoff in IEEE 802.11 Wireless Networks", Mobile Computing and Communications Review, vol. 9, No. 4, 12 pages.

Ramani, I. and Savage, S., "SyncScan: Practical Fast Handoff for 802.11 Infrastructure Networks", IEEE Infocom 2005, 10 pages.

"Configuring WDS, Fast Secure Roaming, and Radio Management", Chapter 11 in Cisco IOS Software Configuration Guide for Cisco Aironet Access Points, 24 pages.

Holland, et al., "A Rate-Adaptive MAC Protocol for Multi-Hop Wireless Networks", In Mobicom 2001, 15 pages.

Sadeghi, et al., "Opportunistic media access for multirate ad hoc networks", in Mobicom 2002, 12 pages.

Brik, et al., "Eliminating handoff latencies in 802.11 WLANs using Multiple Radios: Applications, Experience, and Evaluation", IMC 2005, 6 pages.

Waharte, et al., "Selective Active Scanning for Fast Handoff in WLAN Using Sensor Networks", IEEE MWCN, 2004, 12 pages.

Chandra, et al., "MultiNet: Connecting to Multiple IEEE 802.11 Networks Using a Single Wireless Card", Infocom, 2004, 12 pages.

"The *ns* Manual", Feb. 2, 2007, 415 pages.

Kamerman, A. and Monteban, L., "WaveLAN II: A high-performance wireless LAN for the unlicensed band", Bell Labs Technical Journal, 1997, pp. 118-133.

\* cited by examiner

DECOUPLING SCANNING FROM HANDOFF FOR REDUCED DELAY OVER WIRELESS LAN

BACKGROUND OF INVENTION

1. Field of Invention

The invention relates generally to wireless communication and more particularly to methods to hand off a wireless client between access points.

2. Discussion of Related Art

Voice over IP, or VoIP, is a system for routing voice conversations over an electronic network based on the Internet Protocol (or IP). Most commonly, VoIP conversations are routed over the Internet itself, although they may be routed on any IP-based network. VoIP has advantages over traditional analog voice communications, including reduced cost and the ability to move a VoIP phone number to various locations.

VoIP generally depends on an uninterrupted network connection. If packets carrying voice information are lost or delayed, it may be difficult to sustain a conversation. Many other forms of IP communication similarly require a high quality of service. Examples include videoconferencing as well as streaming video and audio.

IEEE 802.11 is a set of wireless network standards that is now common. Large scale 802.11 wireless networks with multiple access points (or APs) have recently been deployed in university campuses, office buildings, airport terminals, and other public and private venues. Many places around the world (such as San Francisco, Philadelphia, Paris, and Taipei) have developed plans to roll out city-wide 802.11 coverage. When a wireless client moves out of range from one access point and into the range of another access point, the connection must be "handed off" between the APs for the client to remain connected to the network. The standard 802.11 procedure for handing off a wireless client between access points, however, often incurs a significant delay. This delay is typically on the magnitude of hundreds of milliseconds to several seconds, depending on the software and hardware configurations and operation mode of the network(s) involved.

During this handoff period, data service must be temporarily disrupted. This interruption of service can result in a gap in delay-sensitive applications such as VoIP, videoconferencing, streaming media, and video games. A silent gap may be unacceptable to any delay-sensitive applications.

SUMMARY OF INVENTION

This Summary provides an illustrative context for aspects of the invention, in a simplified form. It is not intended to be used to determine the scope of the claimed subject matter. Aspects of the invention are described more fully below in the Detailed Description.

It has been a challenging problem to support real-time delay sensitive applications (such as VoIP and streaming media) in an 802.11 wireless LAN, because the standard handoff procedure implemented in many current 802.11 products incurs a delay deemed unacceptable to VoIP users. There are several factors that contribute to the handoff delay, including the time necessary to scan wireless channels for a new access point (the scanning delay), and the time necessary to associate with the new access point (the association delay). Wireless clients typically use "passive" scanning, in which the wireless card is tuned to a channel and waits for a period of time for a periodic beacon signal on that channel. When performed over a large number of channels, passive scanning can introduce significant delay in the handoff process.

Described herein are various systems and methods for reducing the delay in handoff between wireless access points. In one aspect, the time-consuming channel scan is decoupled from the actual handoff procedure. In another aspect, channel scan delay is eliminated or reduced by scanning early (prior to actual handoff) and interleaving the channel scan with ongoing traffic in a non-intrusive way. In another aspect, a smart handoff trigger is used that covers both uplink and downlink quality, and addresses link asymmetry problems. In another aspect, the methods or systems are implemented in a software-only client-only solution such that existing mobile devices can use aspects of the invention in existing or future 802.11 networks without the need to modify the networks themselves or their access points. The various methods and systems described herein may be implemented separately or combined in various ways.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. The patent or application file contains at least one drawing executed in color. Copies of this patent or patent application publication with color drawing(s) will be provided by the Office upon request and payment of the necessary fee. In the drawings.

DETAILED DESCRIPTION

Where a contiguous geographic area is covered by more than one wireless access point, it may be advantageous to reduce the delay in handoff when a user moves from the coverage area of one AP to another. For example, a user making VoIP calls with a PDA or WiFi-equipped phone should not experience service disruptions or quality degradations to the phone conversation while he or she is moving around in the network or handing off from one AP to another. Similarly, for a user watching a streaming video, whether on a handheld device like an WiFi-enabled cell phone or on a laptop computer, there should be no interruption in service when the user moves between APs. It is commonly believed that for a human to not notice any disruption in voice conversation, the handoff gap should be smaller than 50 ms, although any method that reduces the handoff delay would be beneficial, and the methods and systems described herein are not limited to any particular handoff gap or reduction in handoff delay.

The embodiments disclosed below improve roaming real-time applications (such as VoIP) in any 802.11 network. Although a total handoff delay of less than 50 ms is desirable, any reduction in handoff delay is beneficial. Further, it may be helpful to implement these methods only with software to be run by the wireless client, to avoid the expense of modifying or upgrading the already deployed AP infrastructure, or the hardware for each mobile device. The methods and systems described here are not so limited, however, and may be implemented in hardware or software, or both. They may also be implemented in the client or the access point(s), or both.

In one aspect, a new 802.11 handoff scheme is used called Proactive Scan. Proactive Scan may be implemented as a software module residing at an 802.11 NIC (network interface card) driver to make intelligent handoff decisions, or it could be implemented in the actual network device hardware. When using Proactive Scan, the time consuming channel scanning process is decoupled from the actual handoff process. Additionally or alternatively, the channel scanning may be done early and in a way that does not intrude on the ongoing network traffic. Moreover, the processes or methods may use an intelligent handoff trigger to account for link asymmetry and for better trigger accuracy.

Figure 1:
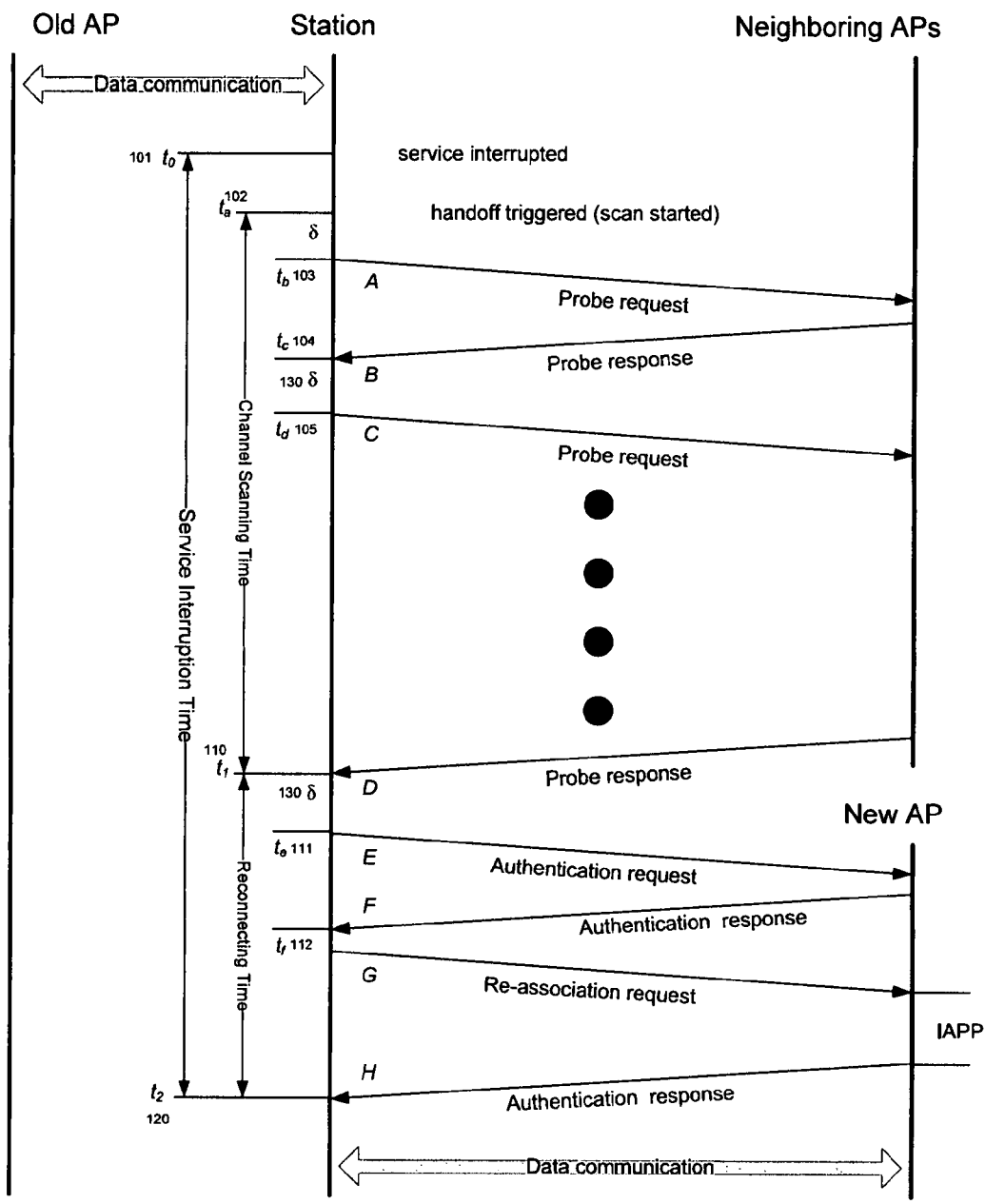
FIG. 1 is a schematic overview of an AP handoff process.

In an 802.11 network, an area may be covered by more than one AP, each operating in one of the many channels available under that standard. A typical single-radio client station may only be able to operate in one channel at a time, and thus only associate and maintain connectivity with one AP. When the client station detects a link quality deterioration with its current AP, it attempts to find a new AP with better link quality in current or other channels, and to switch to the best available. This handoff procedure is illustrated in FIG. 1. Although in the examples below the client station can only operate in one channel at a time and thus only maintain connectivity with one AP at a time, the methods and systems disclosed herein are not so limited and can be applied equally well to a client station that had the ability to associate with multiple APs and/or tune to multiple channels simultaneously. This might occur, for example, in a client station with multiple wireless cards, or a wireless card with multiple radios.

Once the handoff procedure starts, the ongoing data traffic may be interrupted until the handoff procedure finishes. This service interruption time mainly consists of two phases: the channel scanning delay, when the station scans channels to collect information about nearby APs, and the reconnecting delay, when the station switches to the selected new AP. In FIG. 1, $t_0$ (101) is the time when the service starts to be affected, $t_1$ (110) is the time that the channel scanning is completed, and $t_2$ (120) is the time that the station has re-associated with the new AP and is ready for resuming data communication. Note that channel scanning starts at time $t_a$ (102) because it can take $(t_a-t_0)$ time for the station to detect a service interruption event and trigger handoff. The handoff trigger often is set to conservative settings to avoid unnecessary scanning cost if the current AP is still the best among neighbors (i.e., to avoid mis-triggered handoff).

In the first phase of handoff, the station scans all channels to collect information about neighboring APs. Thus, the channel scanning delay is determined by at least three factors: the number of candidate channels to scan, the scan time at each channel, and a channel switching overhead $\delta$ (130). The fixed channel switching overhead $\delta$ (130) may be NIC-dependent, and is usually a few milliseconds in the current products.

The number of channels depends on the type of NIC. For example, 802.11b has eleven channels, and 802.11a has thirteen orthogonal channels. In an Atheros 5212 NIC a/g/b combo NIC, there are twenty-eight channels to scan: eleven for 802.11b, thirteen for 802.11a, and four for "turbo" mode.

The time spent on scanning each channel depends on the scanning method. In the "passive" scan method, the station passively waits to hear periodic beacons transmitted by the neighboring APs in the channel being scanned. A common practice in current 802.11 products is to set beacon intervals at 100 ms and to set passive scan wait time slightly longer at 105 ms. So long as the passive scan wait time is slightly longer than the standard beacon interval, the NIC should be able to detect whether or not an AP exists on the channel being scanned. The process is repeated for each channel to be scanned, thus potentially resulting in an extended delay during handoff.

In the "active" scan method, the station actively broadcasts a probing request frame (message A) before waiting for probe responses from the APs (message B). The wait time is either MinChannelTime (if the station receives no response by the time) or MaxChannelTime (otherwise). These two parameters are defined in the 802.11 standard.

In the second phase of handoff, the reconnection delay consists of link authentication delay (message E and F) and re-association delay (message G and H). The re-association delay includes the time for IAPP (Inter-Access Point Protocol) delay for context switching between the old AP and the new AP.

In the current 802.11 implementations, the entire handoff delay usually ranges from hundreds of milliseconds to several seconds. The majority of this delay is the channel scanning delay because the reconnection phase usually only takes tens of milliseconds. This long delay can result in interruptions to service that diminish the quality of VoIP-type applications and other streaming media. The methods and systems described herein can reduce this delay.

An accurate handoff trigger assists in the performance of any handoff scheme. Triggers widely used in 802.11 include the RSSI (Received Signal Strength Indicator), the number of retransmitted frames at the station, the loss of beacons, and other connection indicators. While other systems use one simple trigger, in the systems and methods described herein, sophisticated triggers may be used that are related to the quality of both the uplink and downlink connections and incorporate more than one indicator of connectivity.

In 802.11 wireless networks, link asymmetry occurs when a client cannot receive and transmit at the same strength. Link asymmetry often occurs for the following reasons: First, the AP and wireless client station likely have different transmission and receiving capabilities. Second, wireless path loss in the two directions can be different. Third, the AP and station may have different hardware and software implementations. Further, a mobile station is usually power-constrained (e.g., to extend battery life on a portable device) and its transmission power can be much lower than APs. Although the AP usually is designed with higher receiving capability, different power capability, link loss and software may still lead to an asymmetric link.

To understand link asymmetry better, uplink and downlink FLR (frame loss ratio) were measured by Applicants at various transmission powers and distances from an AP. The FLR is the loss probability of one link layer frame over the wireless media. Both uplink and downlink FLRs were measured separately and compared. The instrument packets were UDP broadcast packets, with 32-byte frame size and 50 packet per second. Broadcast (rather than unicast) frames were used to avoid retransmissions. A low packet rate was used to ensure no packet would be dropped due to buffer overflow.

Figure 8:
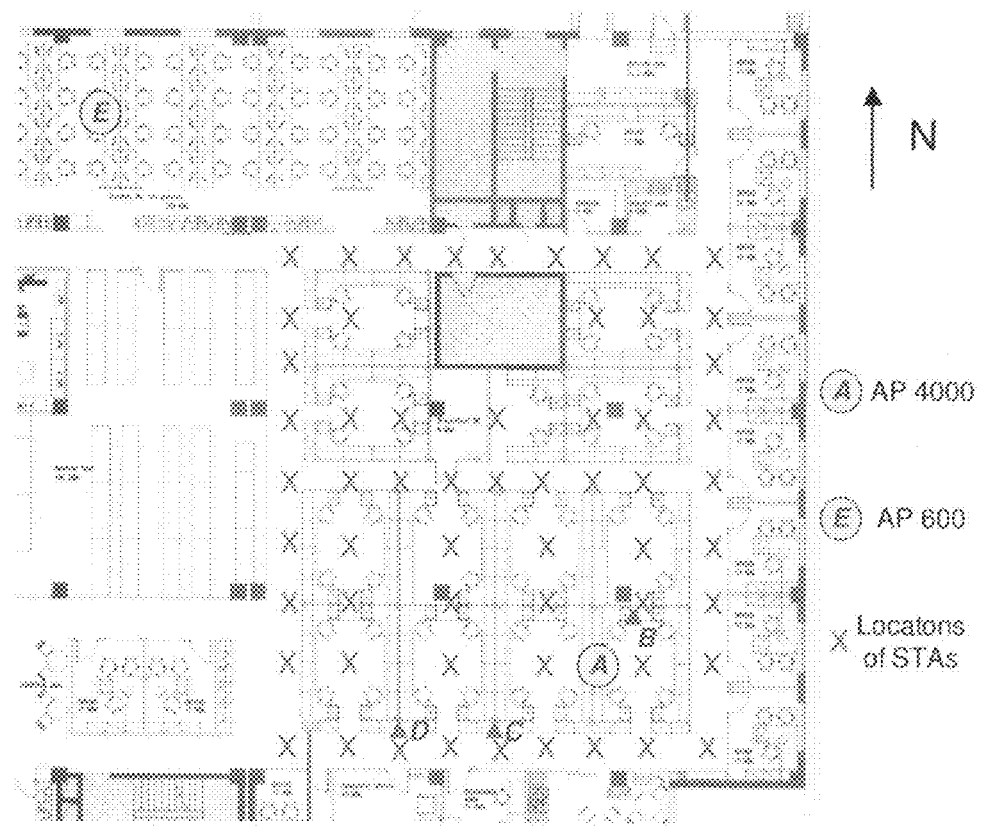
FIG. 8 depicts a testbed used for measuring the AP handoff process.

FIG. 8 depicts a testbed used for measurement as described above. One 802.11a OriNOCO AP 4000 was placed at location A and one Dell D410 laptop was placed at locations B, C, and D. The distance between locations B, C, D and A was 2.2 m, 4.5 m and 8.6 m respectively. In this experiment, the FLR was affected by obstacles such as plants, walls, and pillars, thus the results are location-dependent, rather than distance-dependent. The AP used in the experiment was set to use channel 161. The raw link rates for broadcast frames were set to 24 Mbps for both uplink and downlink. The NIC in the laptop was a Linksys Atheros 5212 a/g/b combo card. The transmission power on the card was set to the highest and then the lowest level to demonstrate the effect of a power constrained mobile station. The following chart illustrates the result of the experiment:

|  | Power | | | |
| --- | --- | --- | --- | --- |
|  | Minimum Transmit Power | | Maximum Transmit Power | |
| Location | Uplink FLR | Downlink FLR | Uplink FLR | Downlink FLR |
| B(2.2 m) | 2.94% | 0% | 1.9% | 0% |
| C(4.5 m) | 5.96% | 0% | 3.92% | 0% |
| D(8.6 m) | 97% | 0.3% | 7.7% | 0% |

This table compares the uplink and downlink FLRs from the experiment described above. As can be seen from the table, downlink FLR was consistently lower than uplink FLR, which is only 0~0.3% for all these three locations. The transmission power at the client station thus can affect the uplink quality greatly, resulting in asymmetry between uplink and downlink. Since 802.11 requires link layer ACK (acknowledgment packets) in the backward direction, poor performance (high FLR) in either direction affects the data traffic performance.

The phenomenon of link asymmetry may also affect 802.11 handoff. First, many NIC implementations use a single trigger that measures quality at one transmission direction (downlink or uplink) and ignores the other. This can lead to the inability to detect poor performance in the opposite direction. Second, if a station uses passive scan in the scanning phase, it will rely only on the downlink quality for handoff decision, since passive scan involves only listening for a beacon signal and thus only receiving. But in the experiment described here, it was observed that at times the access point's beacon can be received by the client station while the station's transmission is not received by the AP. A handoff under these conditions would likely lead to timeouts and a long delay in the reconnection phase.

These problems can result from the use of inadequate handoff triggers in current 802.11 implementations. The purpose of handoff triggers is for a station to monitor the link quality to the current AP and detect performance deteriorations. Triggers that are widely used in 802.11 are based on the RSSI (Received Signal Strength Indicator), the number of retransmitted frames at the station, or the loss of beacons. All of these triggers measure one metric only, and only in one transmission direction. The measurement is done at the station.

RSSI represents the downlink quality. BER (Bit Error Rate) or FLR may accurately represent the link quality since it directly gives the results for any transmission made on such link. However, it is difficult to obtain BER or FLR values in a real system in real time. Although it may be possible to measure the uplink FLR by tracing the number of total (re) transmissions for unicast data frames and those ACKed by AP, that method may not be the best trigger for handoff for several reasons. First, commercial NICs typically do rate adaptation at the packet level and the FLRs at different rates differ, so the measured FLR is actually a mixed one for different rates and difficult to rely on as a handoff trigger. Second, in VoIP and other streaming media applications that employ silence detection and other compression techniques, the traffic is "bursty" and unbalanced between uplink and downlink. Thus, when the user on the WLAN is listening while the peer is talking, there are few packets in the uplink direction to update the FLR and trigger handoff. Since BER or FLR is assumed to be determined by SINR (signal to interference ratio), SINR can also represent link quality but it is equally difficult to obtain its value in real time. Therefore, it is often assumed that interference is stable and that the RSSI represents link quality. It has been shown that there exists a relationship between obtained goodput and RSSI.

It is also possible to use the continuous number of frame retransmissions at the station as a handoff trigger. The number of frame retransmissions is related to the uplink quality. The use of frame retransmissions may not, however, be the best trigger because there may be a temporary burst frame loss in the uplink direction even when the link is good to use after retransmission. This can trigger unnecessarily scans, especially when the station is a mobile device with power constraints. In addition, similar to the constraint of measuring uplink FLR, the unbalanced and bursty real time traffic may also result in too little uplink traffic to use this as a trigger.

None of the triggers described above considers both uplink and downlink quality in making the handoff decision. Because of link asymmetry, however, a trigger that incorporates both uplink and downlink quality may be desirable. It would be possible to modify the AP so that it measures uplink quality like RSSI and sends that information back to each station. This solution, however, may require significant changes and state-keeping at AP. In the embodiments described below, the methods may be implemented on the client side only, although these embodiments could also be incorporated into a system with modified APs.

Proactive Scan may be implemented as a software module residing at an 802.11 NIC driver to make handoff decisions. First, proactive scanning can eliminate the appearance of channel scanning delay. That is, a station will actively probe other channels early and when the handoff trigger is fired it will have all of the updated information to jump to reconnection phase without the need to engage in a separate scan when handoff is triggered. In one aspect of the invention, the actual channel scanning phase is divided into small pieces and interleaved with normal on-going data traffic. Each piece can be small enough (for example, on average 10 milliseconds) so that it introduces no human-detectable interruption to ongoing VoIP sessions, although there is no numerical limitation on how small or large each piece must be.

In another embodiment, active (rather than passive) probing is used, both to reduce the scanning time (smaller pieces) for each channel, and to ensure that the probed AP works well in both the uplink and downlink directions.

In another embodiment, an adaptive algorithm is used to adjust the scanning interval and channel searching sequence to maintain updated information for a reduced delay handoff.

According to these embodiments, it may be possible to reduce the service interruption time during handoff. While not limited to any particular reduction in service interruption time, in some embodiments, the delay is reduced to a mere tens-of-millisecond suitable for VoIP-type applications.

In another embodiment, a rate-based handoff trigger is used that relies on the transmission rate adaptation method commonly used in 802.11 NIC. This handoff trigger covers both uplink and downlink quality and thus addresses the link asymmetry issue.

In another embodiment, the handoff triggering decision is divided into at least two phases. One phase is used to trigger Proactive Scan (called the scan trigger) and the other to trigger actual handoff. This ensures the right balance between scan overhead and handoff timing accuracy.

These embodiments are described in greater detail below.

Triggers for Proactive Scan

Figure 2:
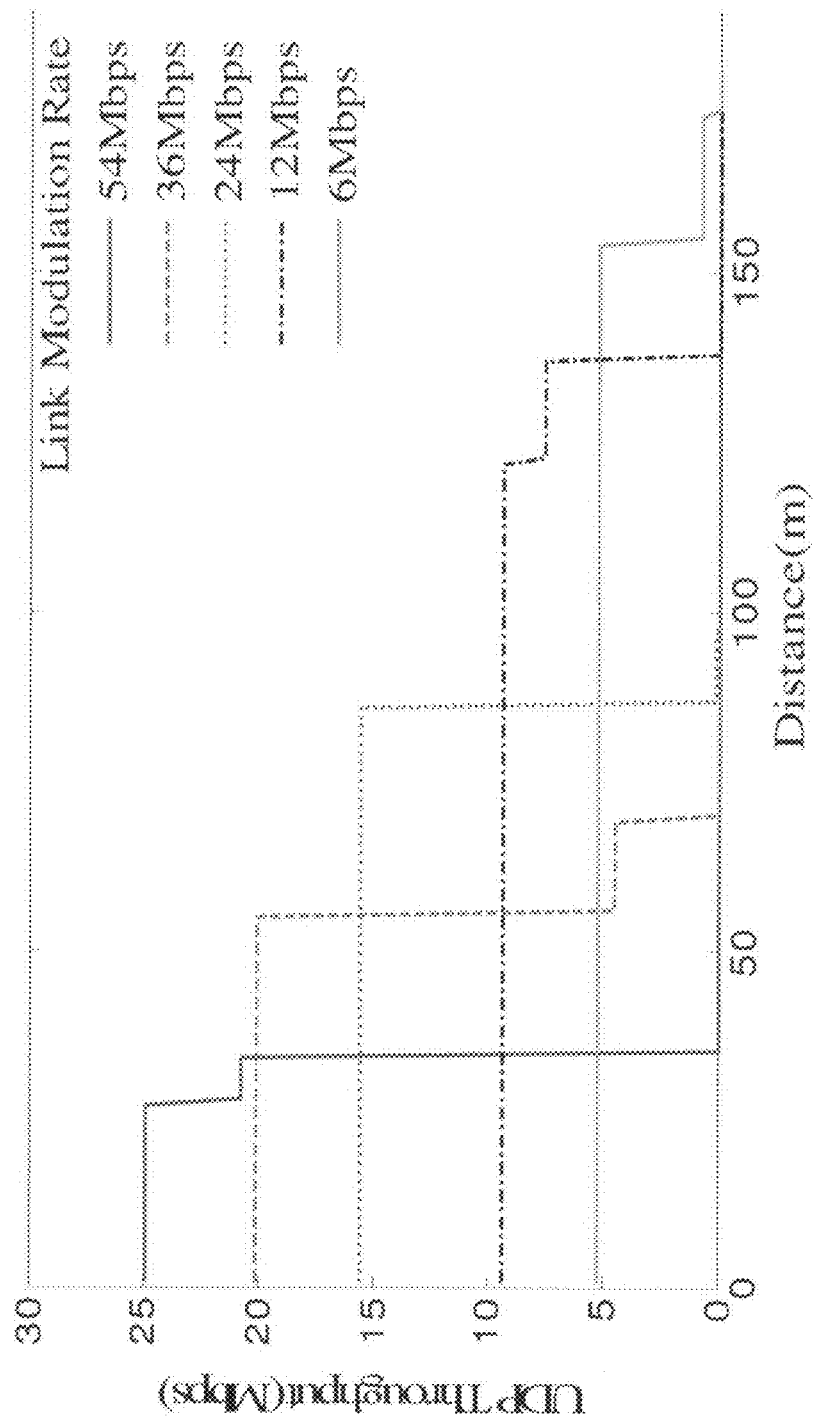
FIG. 2 depicts the relationship between wireless throughput and distance at different data rates.

Multiple bitrates (aka data rates) are defined in the IEEE 802.11 standards. For example, in 802.11b, there are four defined bitrates: 1, 2, 5.5, 11 Mbps. In 802.11a, there are multiple bitrates from 6 Mbps to 54 Mbps. Higher data rates are achieved by using more efficient modulation schemes, which also require higher SINR to decode. Therefore, it is not always preferable to choose the highest data rate for transmission in a low SINR channel, since the achieved performance may be low due to poor FLR. FIG. 2 depicts a simulated relationship between the achieved throughput and the distance (or SINR) in 802.11a at different data rates. These figures were obtained by using both Matlab and NS2 simulations. First, a Matlab link simulation on an OFDM channel was used to obtain the relationship of BER to SINR. The model was then provided to NS2 to obtain the achieved throughput of a greedy UDP on such a link. This experiment shows that, given a certain SINR, there is an optimal rate that achieves the maximal throughput.

Many rate adaptive algorithms in NICs try to dynamically set the transmission rate to that optimal value based on the currently observed link conditions. In current commercial 802.11 interfaces, rate adaptation algorithms are usually already implemented and enabled as a default. In one embodiment, this rate adaptation provides a way to infer the channel condition. The adapted transmission rate is a metric that represents the quality in both the uplink and downlink directions. This is because 802.11 requires an ACK frame for each unicast data packet. Therefore, losses in either data frames or ACKs are counted as a failed transmission at source node, which usually causes rate adaptation.

Figure 3:
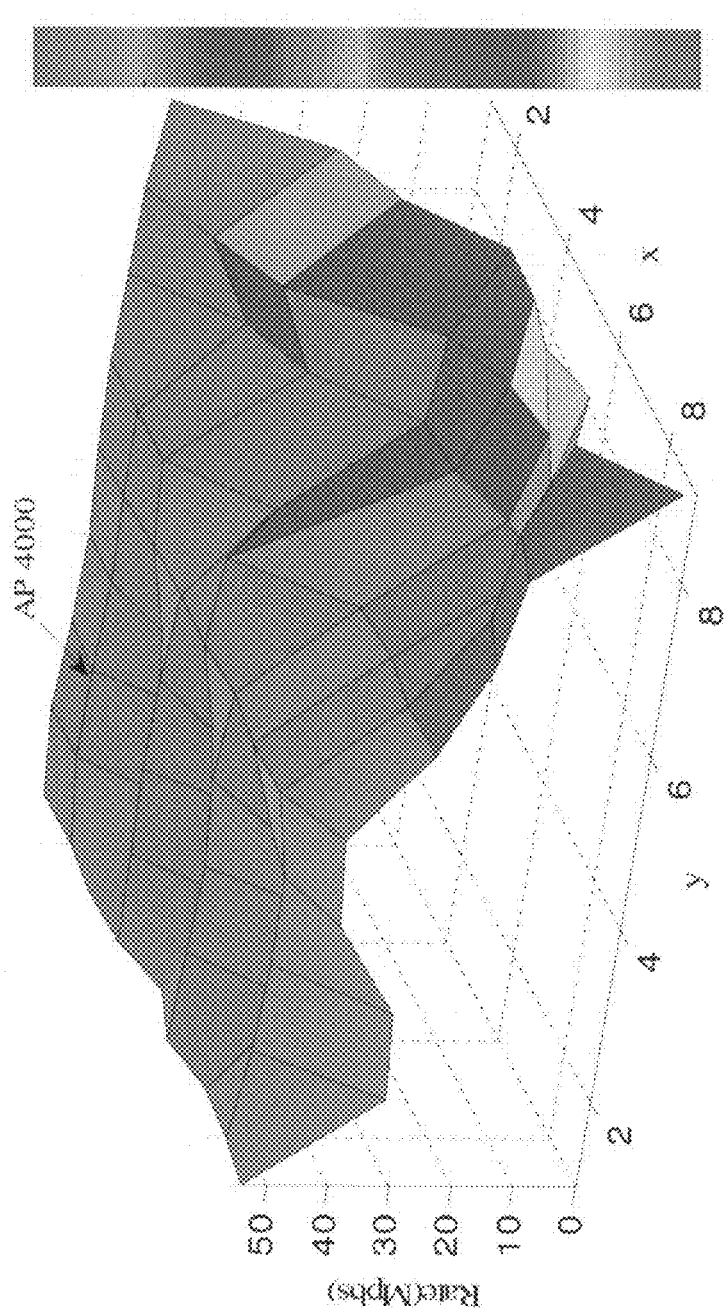
FIG. 3 depicts the results of an experiment where average bitrate values were measured at different locations.

An experiment was performed to show that the adapted rate in commercial NICs is beneficial to use as a triggering condition for both handoff and Proactive Scan. The average rate values were measured from one AP to client stations at different locations in a typical office floor. The AP was a Proxim OriNOCO AP-4000, set to use channel 161. FIG. 8 depicts a map where the places marked as an 'x' measure the averaged rate adapted by the AP when transmitting to the client station. The measured results are shown in FIG. 3. FIG. 3 illustrates several properties. First, there exist areas that the AP can only reach at certain bitrates, and at lower bitrates a larger area is covered centered at the AP. Therefore, rate drops to a certain value can serve as an indicator for the need for handoff. Second, the speed of rate dropping or rising can be used as the indicator of how fast the user is moving.

Figure 4:
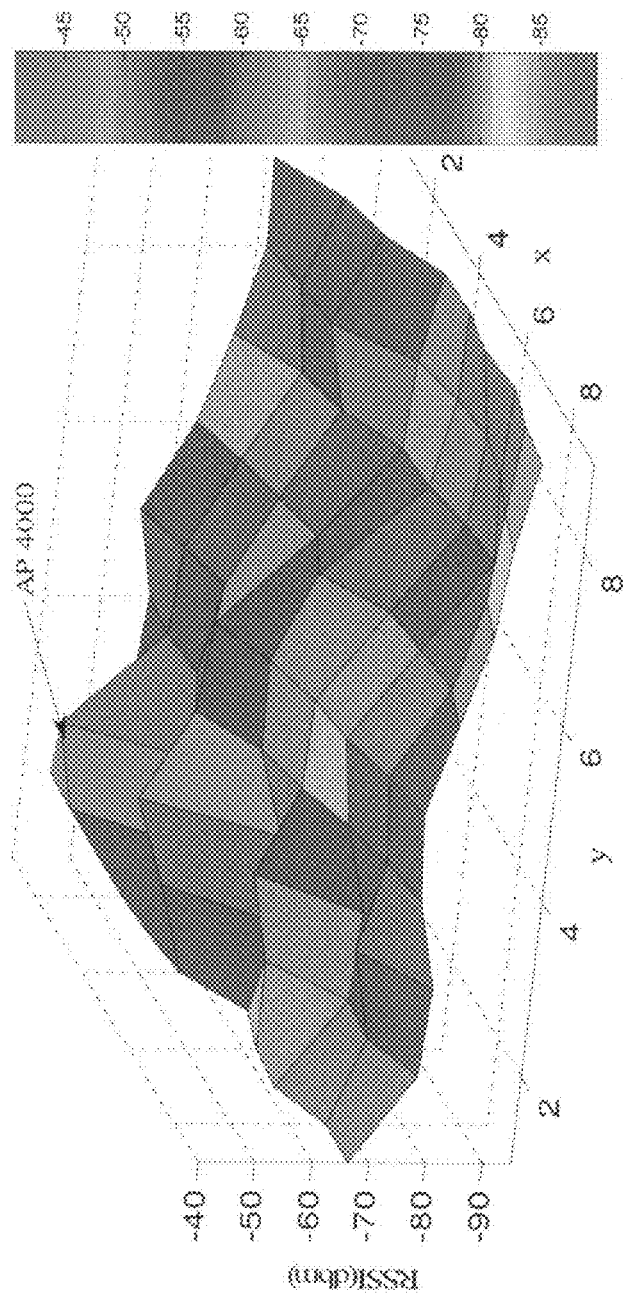
FIG. 4 depicts the results of an experiment where RSSI values were measured at different locations.

To compare the use of transmission rate and RSSI as triggers, the average RSSI values were measured at the same locations as in FIG. 8. The results of that experiment are shown in FIG. 4. FIG. 4 illustrates similar trends as FIG. 3. When the client station is at the edge of the coverage range, the changes in RSSI becomes smaller, so its use to trigger handoff is not as clear. By contrast, the transmission rate drops sharply when the client station is close to the edge, which suggests that transmission rate may be preferable to RSSI as a handoff trigger.

In one embodiment, the client station traces both the transmission rate from the AP and the transmission rate to the AP. The rate value may be filtered by a TSWMA (Time Sliding Window Moving Average) and the smoothed value is used for triggers. It is not necessary, however, to use the smoothed TSWMA value; any method that incorporates the transmission rate as a trigger may be used. For Proactive Scan and handoff, different trigger values may be used.

Figure 5:
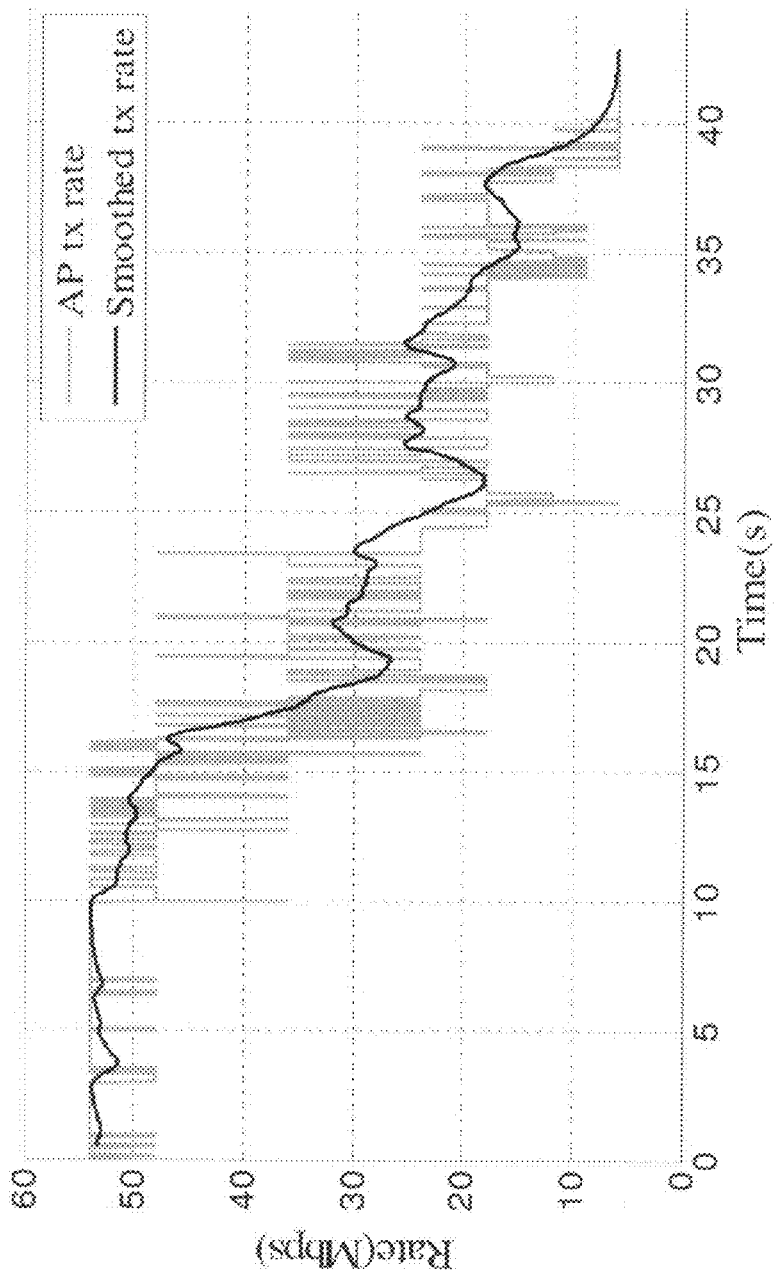
FIG. 5 depicts the results of an experiment where the bitrate was measured while the client station was moving.

The experiment depicted in FIG. 4 shows that the adapted rate works in a static environment (i.e., where the client is stationary). Another experiment was performed to verify that the filtered adapted rate in existing hardware when the user is moving still works as a handoff or Proactive Scan trigger. A laptop equipped with a Linksys Atheros 5212 NIC was used and the transmission rate was recorded from an OriNOCO AP when the station was moved from the center to the edge of AP's coverage area. The result is depicted in FIG. 5. In this experiment, handoff was disabled in order to see the changes of rate at and near the edge of the coverage area. The filter used in this experiment for the transmission rate was TSWMA with 500 ms window size.

FIG. 5 shows that the smoothed transmission rate actually represents the track on which the client station is moving. In one embodiment, in addition to the transmission rate value, the slope of the dropping and increasing of rate may also be useful as a trigger. In a prototype implementation, 20 Mbps was used as the threshold to trigger a Proactive Scan. As described below, in another aspect of the invention, the scan interval (i.e., the time between scanning different channels) can be adapted. In FIG. 5, Proactive Scan was triggered at 26 seconds. The Proactive Scan collects enough information to make the handoff decision.

Any trigger may be used to initiate a Proactive Scan so long as that trigger has some relationship to the connection with the currently connected Access Point. As described above, transmission rate may be one basis for a trigger since most NICs by default adapt the transmission rate as a function of link conditions; however, other implementations of triggering conditions are also possible, either alone or in combination with the transmission rate.

Scan Trigger and Handoff Trigger

As discussed above, adapted transmission rate is actually a metric that represents the quality of connection in both the uplink and downlink directions since 802.11 requires ACK packets in the reverse direction of transmission. Since VoIP and other streaming media traffic may be unbalanced in the uplink and downlink directions and bursty, there may be few packets sent in the uplink direction. Thus, in another embodiment, the adapted transmission rates at both the AP and the station can be used as the basis for a triggering condition for Proactive Scanning or Handoff. The AP's transmission rate is obtained at station when receiving data frames from AP.

In one embodiment, the rate metrics are considered to be valid only under the following conditions: 1) there are certain number of frames transmissions made in the time sliding window and 2) the slope of the smoothed rate is less than a predefined threshold. The first condition is to guarantee that the current rate is adapted with a sufficient number of frames, and the second condition is to ensure that the rate has changed to become lower.

The slope of the smoothed rate may be calculated by historical values in a time windows as follows. Assume that the size of the window is the value s, i.e., it keeps s recent values. The historical smoothed rate values after TSWMA are labeled by $r_i$, where i=1, . . . s, and a smaller index number means a newer sample. The slope k of the smoothed rate is calculated as follows:

$$k = \sum_{i=1}^{s/2} w_i(r_i - r_{i+s/2})/r_1$$

where $0 \le w_i \le 1$, and $w_i$ is the weight for changes in history. In this implementation, by default $w_i$ may be set to 1.

When the transmission rates satisfy the conditions, they are used as triggers. When the conditions are not met, e.g., due to not enough traffic, then RSSI is used as a trigger. With the decoupling of scan from handoff, the triggers for scanning and handoff are also decoupled.

In one embodiment that employs Proactive Scan, a threshold-based solution is used for these three metrics, which means that whenever the value satisfies the threshold (for rate it should satisfy the two conditions first), Proactive Scan is triggered. The trigger is based on the rates if the first two conditions are satisfied, otherwise the RSSI is used. In another aspect of the invention, the scan interval is adapted according to the time-varying link condition, as described in more detail below.

It may be possible that a Proactive Scan is triggered unnecessarily. For example, if the client station moves quickly to the edge of the AP's coverage area and the scan is triggered, but then the client station suddenly turns around to move closer toward the center of the coverage area. In an experiment, it was observed that the relationship between a user's movement/speed and channel quality is extremely complex, and thus the scan interval may be adjusted to a larger value to compensate for user movement.

In one embodiment, both the rate and RSSI were used, with lower thresholds to trigger scanning than handoff, thus ensuring that scanning occurs before handoff. It is not required, however, that an actual handoff operation occur when a handoff is triggered. When a handoff is triggered because either metric falls under a predefined threshold, a best AP is selected based on the collected RSSI measurements of nearby APs. In one embodiment, only when the best AP has a larger RSSI by at least a certain threshold than the current is the handoff performed.

In summary, in various aspects of the invention, both uplink and downlink transmission rates may be used, as well as RSSI, to trigger both Proactive Scan and/or handoff.

Proactive Scan

As described above, in one aspect, the channel scanning phase is decoupled from the reconnecting phase and the channel scanning is performed earlier. Other aspects are described below, including proactive scanning, adaptive scanning interval, and adaptive scanning sequence.

A simple example handoff involves two APs. One AP is the current AP to which the station is connected, while the other is the target AP that the station will soon handoff to. An overlapped area may exist between the two neighbor APs, so that in this area, a station can detect both the signal of current AP and target AP. Since in general nearby APs are configured to use different channels, a client station may switch to another channel to detect whether a nearby AP is available. Switching channels introduces certain time overhead. Active, rather than passive, scanning by probing is advantageous not only because it solves the link asymmetry issue, but it also reduces the required waiting time on target channel to detect whether an AP exists on that channel.

In one embodiment, proactive scanning not only reduces the time overhead, but also obtains updated channel information. The following steps illustrate an embodiment of proactive scanning:

1. Proactive Scan is trigged.
2. Select a candidate channel for scanning by an adaptive channel sequence adjustment procedure (described below).
3. (optional) Send a sleep request to the current AP.
4. Switch to the candidate target channel (if different from the current one), and send out a probe request frame.
5. Switch back to the working channel after a timeout period or a received response frame.
6. (optional) Send awake notification to current AP.
7. Schedule the next channel scanning event by the adaptive scanning interval procedure (described below).

These steps are described in more detail as follows. A Proactive Scan is first triggered by a triggering condition, as discussed above. Any triggering condition may be used. Then, a candidate target channel is selected in any suitable manner. One method for selecting a candidate target channel, an adaptive channel sequence adjustment, is discussed below; however, any method may be used to select a candidate target channel. Once a target channel is selected, in some embodiments the station notifies the AP that the station is going to sleep. According to the 802.11 standard, the station simply marks a bit on the outgoing packet to notify AP that the station is asleep or awake after that packet. This sleep notification makes the AP buffer the packets to this station when the station is proactively scanning other channels. Note that both the sleep step and the awake notification step are completely optional. Sending the sleep and awake requests may avoid packet loss when the station switches to other channel. For the following steps, in some embodiments, active probing is used to detect neighboring APs. In some embodiments, the Min and Max ChannelTime parameters are customized to reduce probing overhead. Finally, in some embodiments, the next channel scanning event will be scheduled after adjusting the interval, as discussed below.

Adaptive Channel Scanning Interval

In some embodiments described above, the Proactive Scan collects information regarding the channel and strength of neighboring APs to be used in the handoff decision. As each scan takes a certain amount of time overhead, the decision as to how often the scan should be performed represents a tradeoff between overhead and information accuracy. If scanning is performed too frequently, the performance of the ongoing service may deteriorate. If the scanning is not performed frequently enough, the collected information regarding neighboring APs may be outdated, thus possibly leading to the wrong handoff decision.

In an aspect of the invention, the interval of Proactive Scanning is adaptive. Adapting the interval of scanning may be beneficial for several reasons. Users may move at different speeds, and the coverage range may change due to physical obstacles, so that the time that the user stays in an area overlapped by more than one AP may vary. There may also be multiple APs and channels, and due to the impact of obstacles, the shape of the overlapping area may be difficult to predict.

In addition, the moving path of the user may be unpredictable. By adapting the channel scan interval to these varying conditions, it is more likely that all APs will be detected when a user moves between different overlapped areas.

In one embodiment, the proactive channel scan interval (i.e., the time that the client station remains connected to the existing AP between channel scans) is adaptively adjusted according to the RSSI and adapted rate. Both the smoothed value and the slope for value difference within the same time interval can be used as triggers. Other measures of connectivity may also be used.

In one embodiment, two threshold values of indicators of connectivity are used, for example, $Th_h$ and $Th_l$. With two thresholds, three scanning interval values can be used: $I_h$, $I_m$, $I_l$, where $I_h > I_m > I_l$. If a higher Th value means better connectivity, then a larger interval for scanning can be used. For example, if x is the smoothed value of some connectivity indicator, e.g., RSSI, or tx(rx) rate using TSWMA, and $n_i$ is the time interval between channel scanning, the following steps can be followed:

1. If $x < Th_l$, then $n_i = I_l$
2. Else if $x < Th_h$, then $n_i = I_m$
3. Else $n_i = I_h$ Any number of thresholds and scanning intervals can be used. Moreover, this aspect of the invention is not limited to any particular measure of connectivity.

In an embodiment, multiple values can be used in parallel, $x_1, x_2, x_3 \ldots$, each with a corresponding threshold, $Th_{1,l}$, $Th_{2,l}, \ldots$. In this embodiment, the time interval adaptation algorithm can work as follows:

1. If $x_1 < Th_{1,l}$ or $x_2 < Th_{2,l}$ or $x_3 < Th_{3,l}$ ..., then $n_i = I_l$
2. Else if $x_1 < Th_{1,h}$ or $x_2 < Th_{2,h}$ or $x_3 < Th_{3,h}$ ..., then $n_i = I_m$
3. Else $n_i = I_h$ Adaptive Channel Scanning Sequence The wireless station may not already have information regarding the channels and signal strengths of neighboring APs. In order to determine which neighboring APs are available, a full channel scan can be performed to insure that all APs are detected in accordance with one embodiment. The 802.11 standards defines multiple channels, while in real deployment, for each AP, the number of neighboring APs for handoff is generally less than the total number of channels. For example, with an 802.11a/g combo NIC, twenty-eight channels need to be scanned (eleven for b, thirteen for a, and four for combo) at least once to perform a complete scan, but usually there are fewer than ten neighboring APs. Thus, most of the channels probed will not provide any information about neighboring APs. Moreover, scanning the channels one at a time can result in the obtained neighboring AP information becoming obsolete due to the length of time it takes to scan each channel. Even if a small channel scanning interval is used, e.g., 100 ms between scans, it will take 2.8 seconds to scan each channel if there are 28 channels for a/g/b combo NIC. A user carrying a wireless client station may move 5-6 meters in 2.8 s, which means a sample obtained previously within several meters may be outdated.

Thus, in an embodiment, a priority scan channel list is used in addition to the full channel list. The priority channel list may contain all the channels where known APs exist. In some embodiments, the priority channel list contains those APs that use the same SSID (Service Set Identifier) as that of the currently-connected AP. Those APs to which the client station has connected before with the same SSID may also be stored in the priority list. The priority channel list may change over time during the Proactive Scan when the station finds more neighboring APs with the same SSID. Thus, with priority channel list, those potential candidate channels are scanned multiple times.

In an embodiment, the number channel scan opportunities for the priority channel scan list is $N_O = \max(N_p, \gamma^* N_f)$, where $N_p$ is the number of channels in the priority channel list and $N_f$ is the number of all channels, and $\gamma$ is an arbitrary ratio to weigh the priority channel list against the full channel list. In an embodiment, $\gamma = 0.2$. The scanning of channels on the priority list is interspersed with scanning of the full channel scan list. In general, in between every $N_f/(N_O+1)$ number of channels in the full channel scan, a channel from the priority scan list is scanned. In an experiment, it was observed that the priority channel scanning maintains updated channel information for those candidates that have a higher probability of being the target for a handoff.

System Design and Implementation

Figure 6:
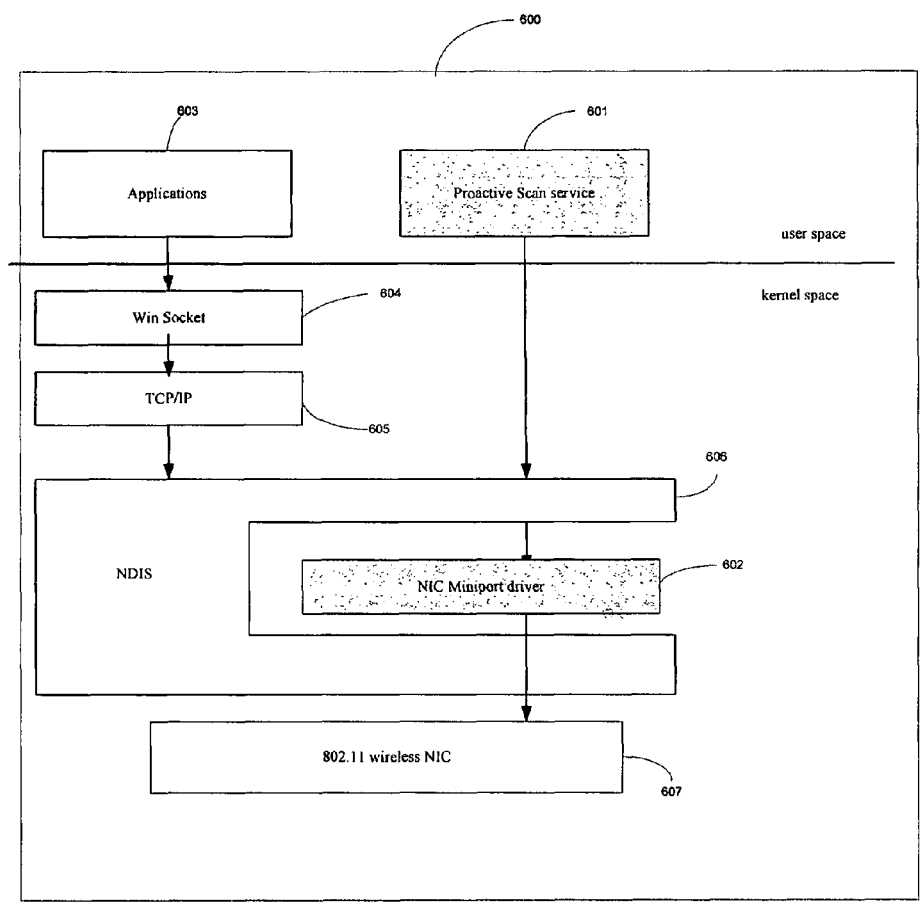
FIG. 6 depicts the architecture of an example implementation of Proactive Scanning in accordance with one embodiment.

A prototype implementation of a system employing Proactive Scan on a Windows platform for the Atheros 5212 driver is illustrated in FIG. 6.

The Proactive Scan module 601 is marked in FIG. 6 in light shadow. The NIC miniport driver 602 (Atheros 5212 driver in the prototype) is modified to support a Proactive Scan algorithm. In addition, the Proactive Scan service module 601 provides application interfaces for the user to interact with the scan algorithm. In the example system 600, both the trigger and adaptation algorithms for channel scanning order as well as interval are implemented in miniport driver; while the proactive scan service only serves to enable/disable and change the profile and parameter settings. Based on this design, an alternate implementation method is to open more APIs at the miniport driver 602, and move more operations to proactive scan service module. The design serves as a general framework and provides the flexibility to balance implementation overhead on different software modules, and is provided here only as an example implementation.

In the illustrative implementation shown, the channel switching overhead for NIC to scan another channel is hardware-dependent. For example, for the Linksys Atheros 5212 NIC, switching channels introduces about 2.9 ms overhead by hardware. Thus, scanning another channel proactively introduces at least 5.8 ms of overhead by hardware, since the NIC must first switch to the channel to be scanned and then back to the channel for the current connection. The time needed to wait on the target channel to detect an AP depends on the traffic load on that channel. With the illustrated implementation, an experiment was performed to evaluate the impact of traffic load to active probing time. The active probing time was measured, from the time that the NIC prepares the probe frame to the time that the NIC receives the response frame, under various background traffic load. UDP and TCP background traffic were generated to and from the AP on the target channel. For UDP, the traffic rate was set to 20 Mbps, and for TCP a greedy FTP transfer was done with a measured TCP throughput around 24 Mbps. The averaged active probing time versus different background traffic are shown in the table below, where the total denotes the time overhead including both waiting and channel switching.

| Traffic on target channel | Averaged Waiting Time - Probe & Response (in ms) | Total (in ms) |
|---|---|---|
| No Traffic | 0.71 | 6.49 |
| TCP(AP→STA) | 1.63 | 7.44 |
| TCP(STA→AP) | 2.08 | 7.89 |
| 20 Mbps UDP(AP→STA) | 0.93 | 6.72 |
| 20 Mbps UDP(STA→AP) | 1.04 | 6.85 |

By using active probing, in the experiment, the time necessary to wait on the target channel to detect an AP was reduced to 2 ms on average, which is lower than the default scan time setting in most NIC drivers. The maximal waiting time observed in the experiment was 4 ms. Thus, Min(Max) ChannelTime was set to 5 ms, which, based on the experimental data, guaranteed that most probe response frames would be received. In the prototype, another constraint is the coarse granularity of timer scheduling in the operating system. The default timer granularity is about 10 ms for a Windows NIC driver, so the maximal waiting time for probing may enlarge to 10 ms in some implementations.

With 10.8(5+5.8) ms average overhead time to scan one channel, the ratio of the overhead introduced for Proactive Scan is determined by the scan interval. In the prototype implementation, the default channel scan interval was set to 200 ms (i.e., 200 ms connected to the current AP between scanning individual channels). To adaptively change the scan interval, the parameters used for the scanning interval were: $I_h$=300 ms, $I_m$=200 ms, $I_l$=100 ms.

Experimental Results

Figure 7:
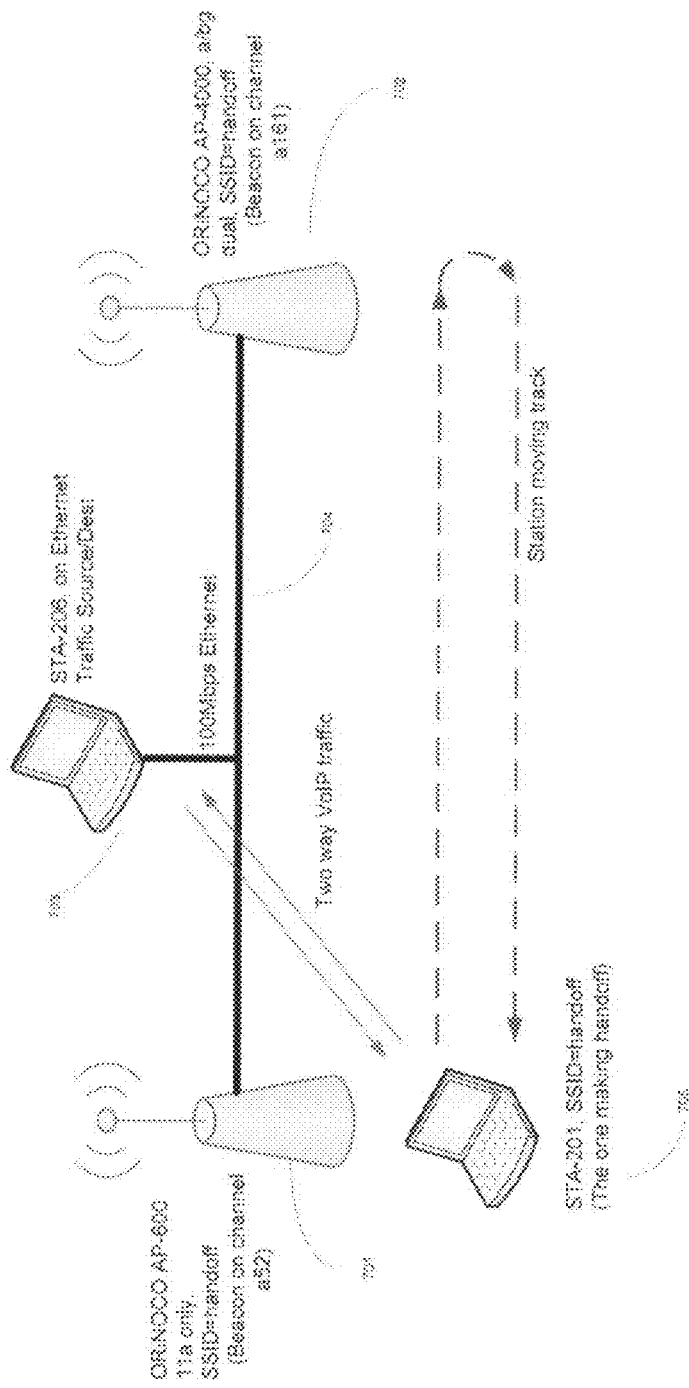
FIG. 7 depicts the logical topology and configuration of an experimental configuration in accordance with some embodiments.

The logical topology and configuration of one experimental configuration in accordance with some embodiments, as well as the direction of network traffic, are illustrated in FIG. 7.

In some experiments conducted, two Proxim APs, OriNOCO AP-4000 702 and AP-600 701 were connected through 100M Ethernet. One Dell desktop (GX260) 703, labeled as STA-206, connected the two APs (702 and 701) through an Ethernet network 704. One Dell laptop (D400) 705, labeled as STA-201, connected one of the two APs using an Atheros 5212 wireless a/b/g combo NIC. The experiments were performed in an office building, shown in FIG. 8. The two APs were placed in locations A and E. The asymmetric link was measured at locations B, C, and D. The transmission rates and RSSI were measured at the locations marked with x's. The solid boxes in the figure denote the pillars in the building (approximately one square meter each). The APs at location A and E were configured to use the same SSID. There were also six other APs in this area that belonged to a different network with a different SSID.

Service Interruption During Handoff

The latency introduced during handoff results in service interruption, deteriorating the performance significantly. To measure the impact to real time application, a VoIP application using GSM 06.10 codec with a frame interval of 20 ms and packet size of 33 bytes was used. A VoIP connection was established between STA-201 and STA-206. The inter-arrival time (IAT) of packets was measured at both ends.

Figure 9:
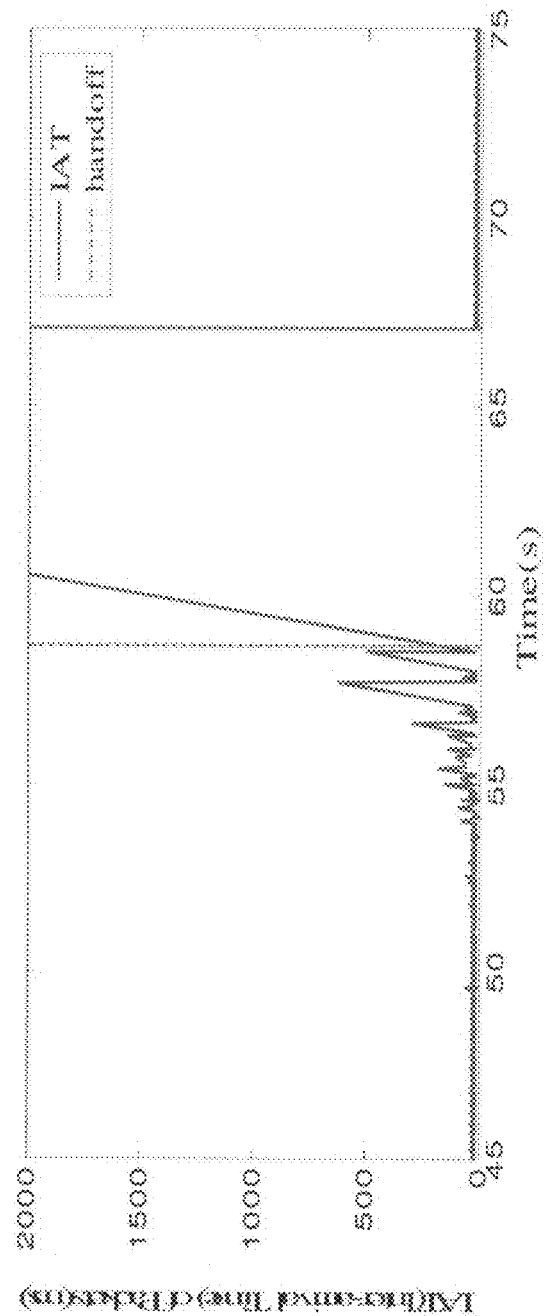
FIG. 9 depicts the results of an experiment to measure the performance of an AP handoff.

The performance of a standard AP handoff using the Atheros 5212 driver on Windows XP is shown in FIG. 9. FIG. 9 shows that the driver starts the handoff and scans other available channels starting at time 58.68 s. The scan took about 8 s to perform the complete scan of 28 channels on a combo a/g/b NIC. The smallest scan time for this driver measured experimentally was about 3 s. The service interruption time, however, was longer than the scanning time. In FIG. 9, it was observed that before the handoff was triggered, the service level was already poor after time 55 s. Using a conservative trigger for handoff thus enlarges the total service interruption time for normal handoff.

Figure 10:
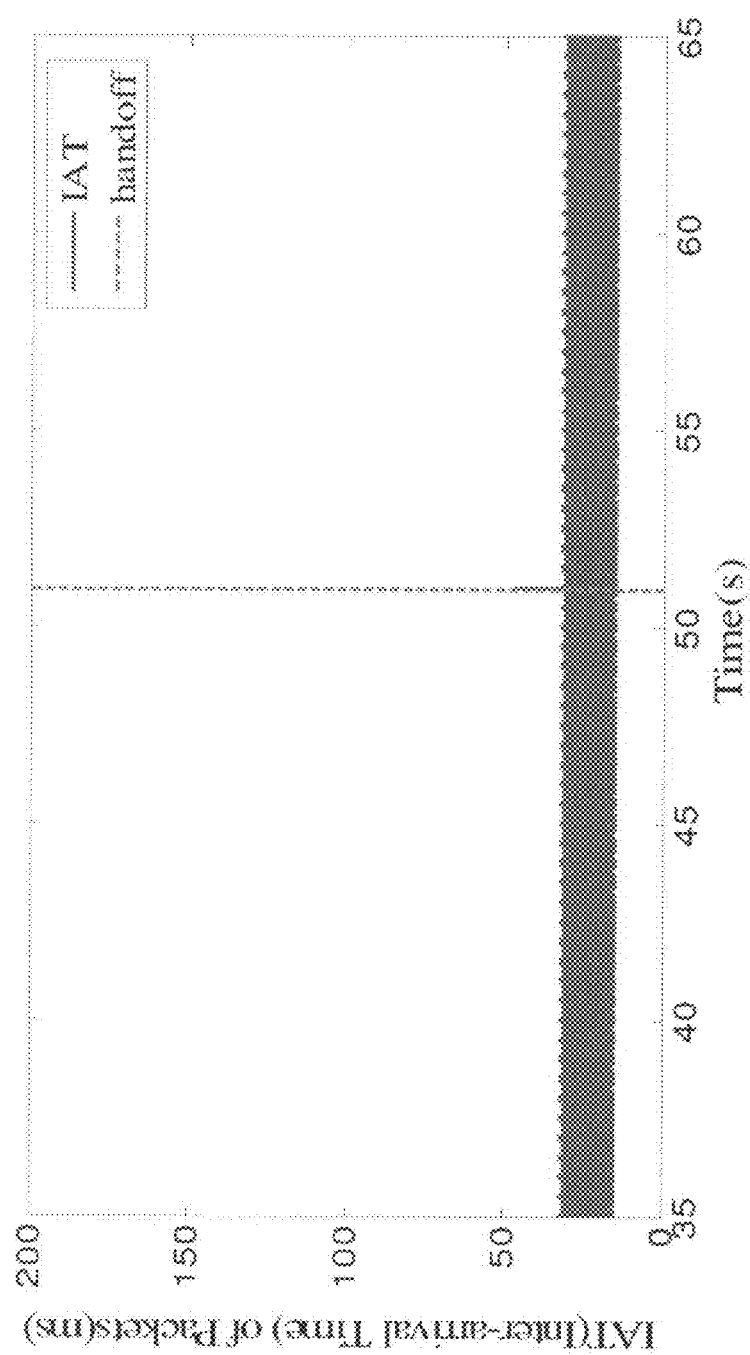
FIG. 10 depicts the results of an experiment to measure the inter-arrival time of wireless packets in accordance with some embodiments.

The measured IAT of packets in the prototype implementation described above is depicted in FIG. 10. In that figure, the client station was walked on the same path at approximately the same speed as the handoff experiment shown in FIG. 9. In FIG. 10, the handoff occurred at time 51.03 s, introducing only a 47 ms IAT for one packet in the downlink direction. The experiment was repeated with other tracks for movement, and at most one downlink packet drop was observed during handoff and no uplink packet loss. The 802.11 Inter-Access Point Protocol (IAPP) was not used in the experiment.

Figure 11:
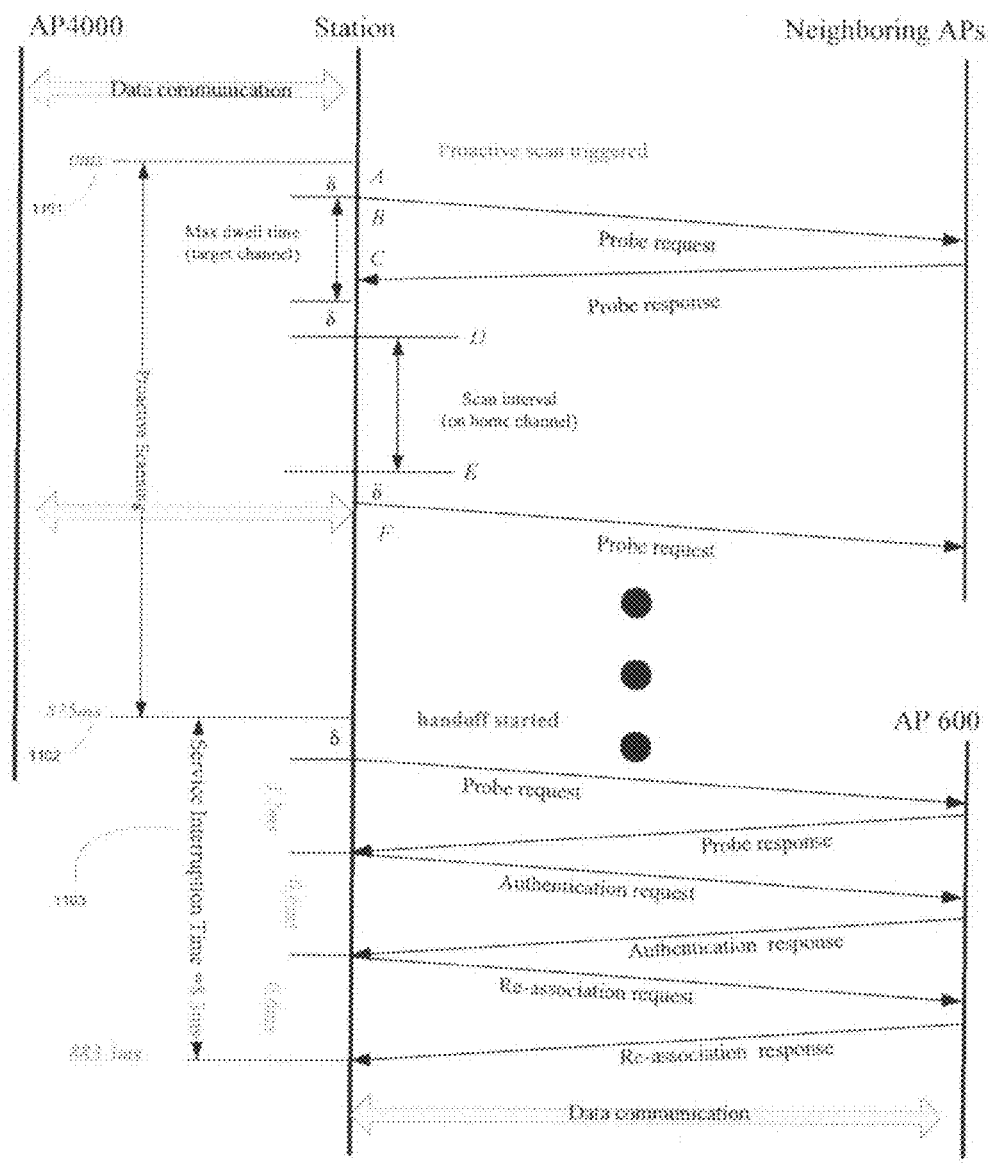
FIG. 11 depicts an example handoff procedure according to some embodiments.

FIG. 11 shows an overview of an example handoff procedure according to some embodiments of the invention. The time that proactive scan is triggered is marked in FIG. 11 as 0 ms (1101). The Proactive Scan in this example is stopped at 875 ms (1102) as the handoff is triggered. In this example, it takes 8.3 ms to finish connecting to the new AP (without the use of IAPP). This interval is shown as 1103. Thus, the total service interruption time in the handoff procedure is 8.3 ms. If a single packet arrives at the previous AP during this handoff period, then the result may be a single packet loss. Since the packet interval was 20 ms in the experiment, at most one packet was dropped. In this example, the 875 ms Proactive Scan time depends on the user moving track and speed. In experiments, it was observed that the Proactive Scan time ranged from hundreds of milliseconds to several seconds.

Overhead Introduced by Proactive Scan

During Proactive Scan, the ongoing real-time application may be impacted from the scanning operation on other channels. To evaluate the overhead introduced by an example implementation of Proactive Scan, an experiment was performed where Proactive Scan was continuously enabled, and the performance was measured under different scan intervals.

Figure 12:
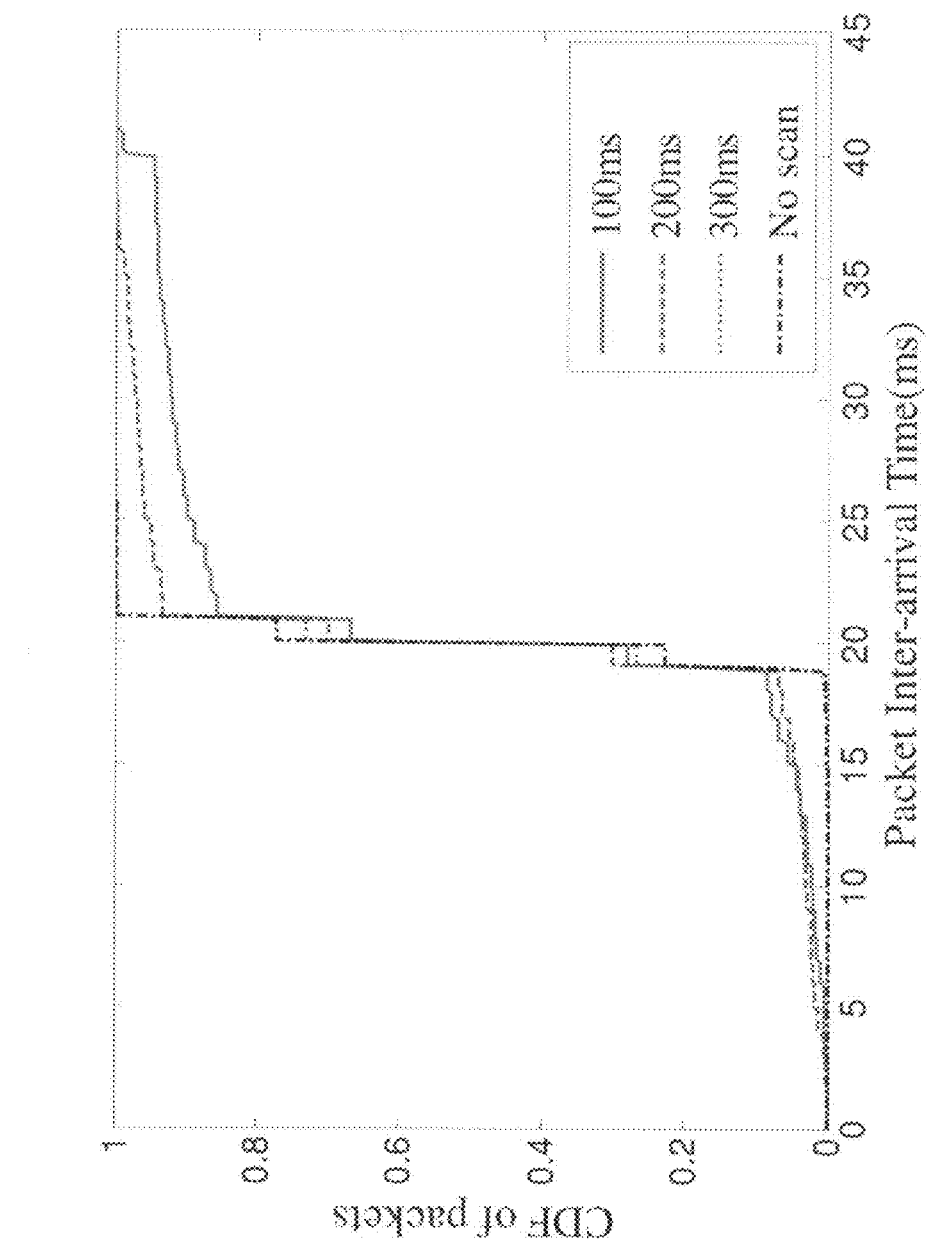
FIG. 12 depicts the results of an experiment to measure the inter-arrival time of wireless packets according to some embodiments.

For VoIP-like application, performance can be judged by the IAT (inter-arrival time) of packets since it denotes the jitter variation. The sender (STA-206) generates UDP packets at 50 packets/s spaced at 20 ms equally to STA-201 through the AP, and the CDF (cumulative distribution function) of IAT of packets received at the station side was measured. FIG. 12 gives the measured results of an experiment for a continuous scan interval at 100-300 ms, as well as when the Proactive Scan was disabled. The average IAT was 20 ms in measurement under all the scan interval setups. It was observed that a 300 ms channel scanning interval introduced negligible impact on packet IAT. In addition, the default 200 ms interval introduced only an approximately 5% packet inter-arrival time larger than 25 ms, with the maximal value at 35 ms. An experiment was also performed in which a VoIP application was used with continuous scanning according to the example implementation described above, and no impact to the voice quality of the VoIP application was detected during the experiment for all settings.

An example Proactive Scan implementation was also tested for FTP traffic to determine whether the implementation would affect TCP's self-clocking and impact performance. A greedy FTP connection was set up between STA-201 and STA-206. TCP throughput may be sensitive to the link rate, which is adjusted by rate adaptation. In the experiment, the automatic rate adaptation was disabled for the TCP connection, and a fixed link rate was used for comparison. The TCP throughputs for uplink and downlink were measured respectively, shown in the table below. In order to quantify the overhead introduced by the example Proactive Scan implementation, the ratio of obtained TCP throughput under different Proactive Scan intervals was calculated, such that a larger ratio would mean smaller introduced overhead. Under the default 200 ms scan interval in the example implementation, the overhead introduced to greedy TCP traffic was about 10%. When the link rate was smaller, e.g., 12 Mbps rather than 54 Mbps, the packet transmission time became longer while the time overhead introduced by the example Proactive Scan did not change, and thus the throughput ratio became larger.

| Link | | Interval TCP throughput (Mbps) | | | |
|---|---|---|---|---|---|
| Rate | Traffic | 100 ms | 200 ms | 300 ms | No scan |
| 54 Mbps | Upload | 17.3(76%) | 20.57(91%) | 21.43(94.9%) | 22.57 |
| | Download | 14.52(64%) | 18.88(84%) | 20.32(90%) | 22.69 |
| 12 Mbps | Upload | 6.48(77%) | 7.90(94%) | 8.37(99.7%) | 8.39 |
| | Download | 6.7(80%) | 7.8(93%) | 8.33(99.6%) | 8.36 |

Figure 14:
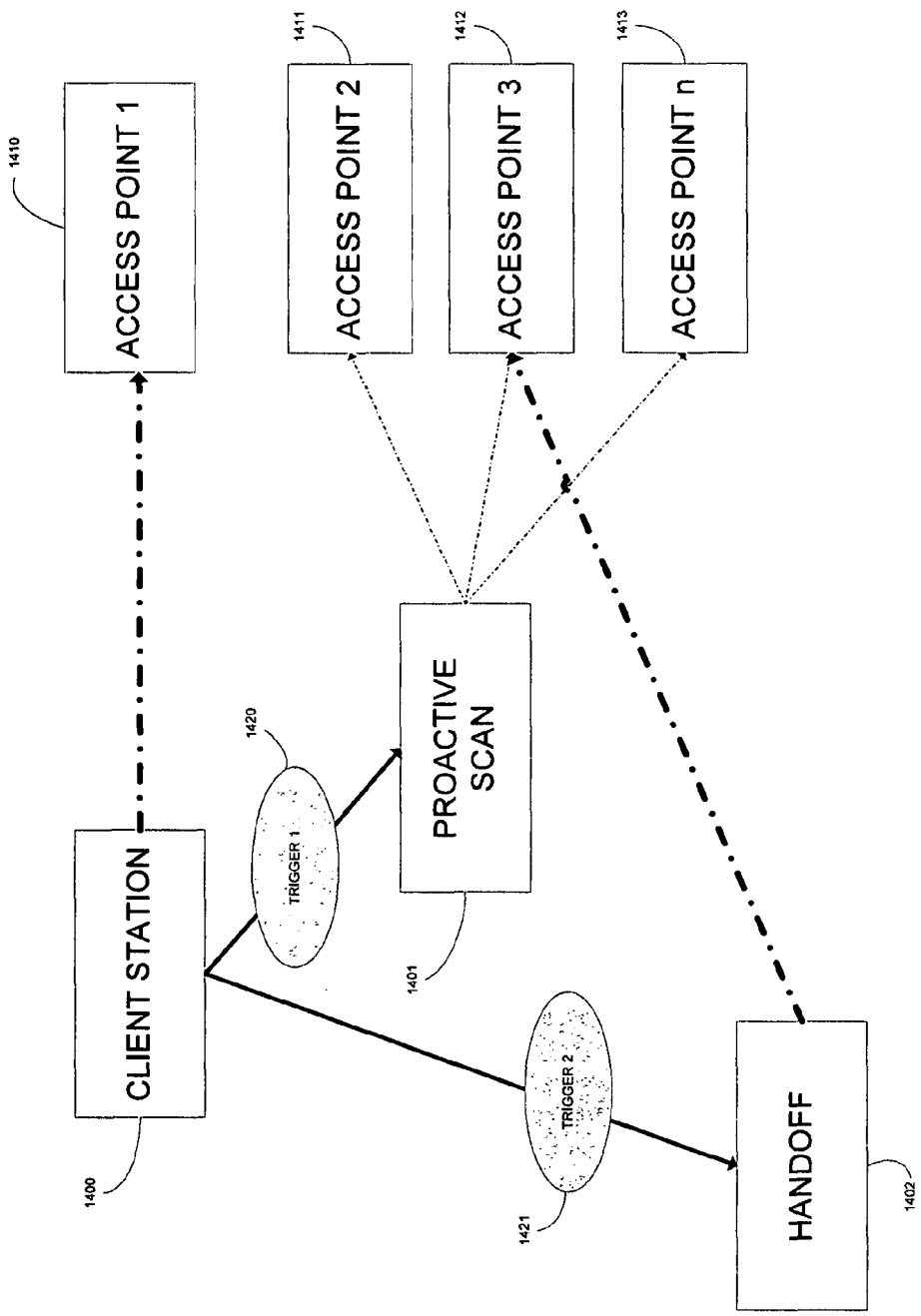
FIG. 14 depicts a simplified schematic of one embodiment of the invention.

FIG. 14 depicts a simplified schematic of one embodiment of the invention, showing both a Proactive Scan 1401 and a Handoff 1402 in response to different triggering conditions 1420 and 1421. In FIG. 14, the client station 1400 is associated with an access point 1410. In response to a triggering condition (or set of triggering conditions) 1420, the client station 1400 performs a proactive scan 1401. These triggering conditions may be any measure of connectivity, including (but not limited to) RSSI, received transmit rate, dropped packets, etc. The client may use one triggering condition or several, combined in any way. These triggering conditions are described in more detail above.

The proactive scan 1401 detects the existence of other access points on channels other than the first access point 1410. In the figure, the Proactive Scan 1401 may detect several access points 1411, 1412, and 1413 (representing 'n' other access points). The client station 1400 retains the information gathered by the Proactive Scan 1401 but remains associated with the original access point 1410. Note that the Proactive Scan 1401 need not scan all the channels at once. As described in more detail above, the Proactive Scan 1401 may scan only one channel, after which the client station 1400 will return to its connection with the original access point 1410. After a predefined scanning interval, if the triggering condition 1420 is still present, the Proactive Scan 1401 may scan another channel, and repeat this process until information about all channels has been gathered, and then start again. Additionally, the channels may be scanned in any order, or in simple ascending or descending order, or in an adaptive sequence as described above.

In response to another triggering condition or set of triggering conditions 1421, the client station 1400 enters into a handoff 1402. In some embodiments, handoff 1402 is only triggered if the information collected by the Proactive Scan 1401 indicates that there is another access point with a stronger signal than the currently associated access point. Note that when the handoff 1402 is initiated, it is not necessary to perform another channel scan at that time, since the information regarding neighboring access points 1411, 1412, and 1413 has already been collected.

In FIG. 14, the access point labeled "access point 3" 1412 has a better signal than the currently associated access point labeled "access point 1" 1410, and the triggering condition(s) for a handoff 1421 has been met, and thus a handoff 1402 is performed to associate the client station 1400 with access point 3 1412. This may occur, for example, because the client station 1400 has moved further away from the original access point 1410 and is now closer to the new access point 1412. Once the client station 1400 is associated with the new access point 3 1412, the client station may again perform a Proactive Scan 1401 in response to a trigger 1420. The process can be repeated indefinitely.

Figure 13:
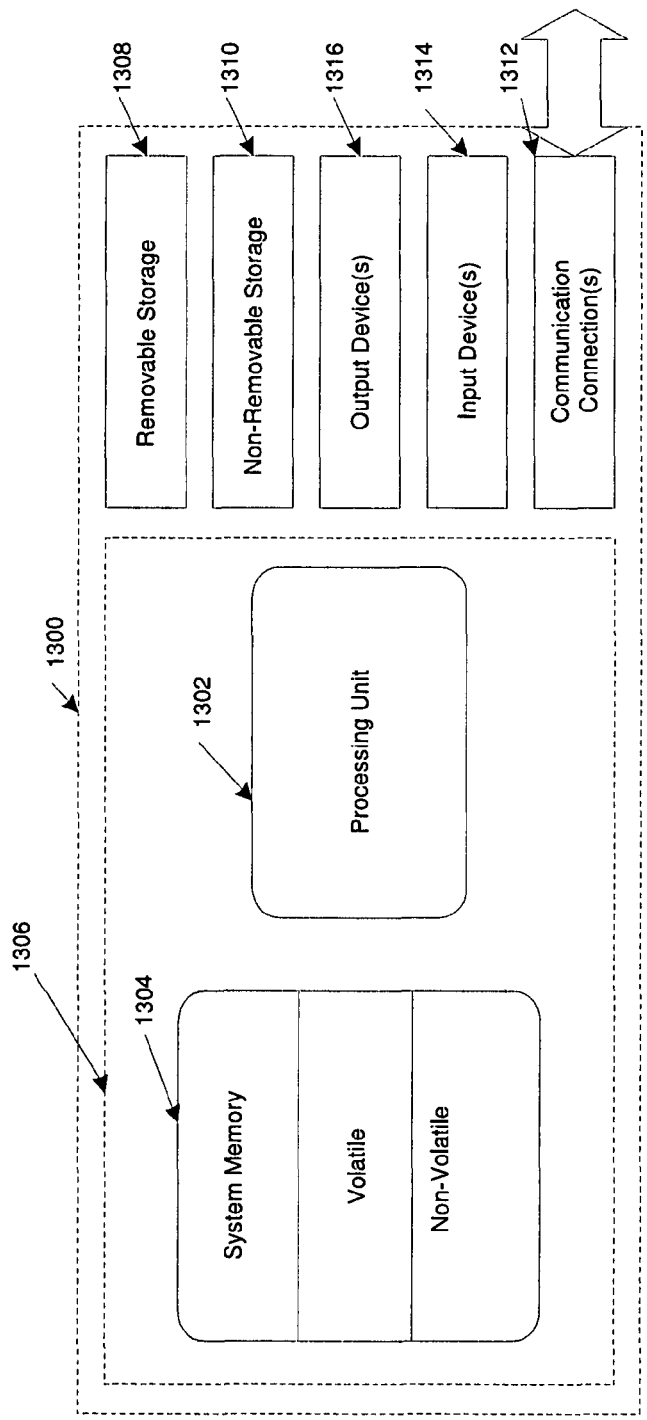
FIG. 13 depicts an exemplary system for implementing embodiments of the invention.

A general-purpose computing system will now be described, on which embodiments of the invention may be implemented. With reference to FIG. 13, an exemplary system for implementing embodiments of the invention includes a computing device, such as computing device 1300, which may be a device suitable to function as a node of network environment. Computing device 1300 may include at least one processing unit 1302 and memory 1304. Depending on the exact configuration and type of computing device, memory 1304 may be volatile (such as RAM), non-volatile (such as ROM, flash memory, etc.) or some combination of the two. This most basic configuration is illustrated in FIG. 13 by dashed line 1306. Additionally, device 1300 may also have additional features/functionality. Memory 1304 is a form of computer-readable media that may store instructions, having wireless medium parameters for various nodes in network environment.

Device 1300 may include at least some form of computer readable media. Computer readable media can be any available media that can be accessed by device 1300. By way of example, and not limitation, computer readable media may comprise computer storage media and communication media. For example, device 1300 may also include additional storage (removable and/or non-removable) including, but not limited to, magnetic or optical disks or tape. Such additional storage is illustrated in FIG. 13 by removable storage 1308 and non-removable storage 1310. Computer storage media includes volatile and nonvolatile, removable and non-removable media implemented in any method or technology for storage of information such as computer readable instructions, data structures, program modules or other data. Memory 1304, removable storage 1308 and non-removable storage 1310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 1300. Any such computer storage media may be part of device 1300.

Device 1300 may also contain communications connection(s) 1312 that allow the device to communicate with other devices. Communications connection(s) 1312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 1300 may also have input device(s) 1314 such as keyboard, mouse, pen, voice input device, touch input device, etc. Output device(s) 1316 such as a display, speakers, printer, etc. may also be included. All these devices are well know in the art and need not be discussed at length here.

It should be appreciated that the invention is not limited to executing on any particular system or group of systems. For example, embodiments of the invention may run on one device or on a combination of devices. Also, it should be appreciated that the invention is not limited to any particular architecture, network, or communication protocol.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method for use in a wireless communication system comprising a wireless client and a plurality of wireless access points, wherein the wireless client associates with one of the plurality of wireless access points to enable communication therethrough, the method comprising acts of:
   a) in response to a first set of at least one triggering condition depending on a property of a first wireless connection between the wireless client and a first wireless access point of the plurality of wireless access points, actively scanning using an adaptive scanning interval to detect which of the plurality of access points is within range to enable association with the client, wherein the first wireless access point has a service set identifier (SSID), and the actively scanning using an adaptive scanning interval comprises:
   maintaining a priority scan channel list, wherein each channel in the priority scan channel list contains an access point that has the SSID of the first wireless access point,
   actively scanning each channel in the priority scan channel list by broadcasting a probing request frame before waiting for at least one response to the probing request frame from wireless access points in the channel, and
   after a channel scanning time interval, actively scanning each channel in the priority scan channel list a second time, wherein the channel scanning time interval is determined based on a measure of connectivity; and
   b) in response to a second set of at least one triggering condition that differs from the first set of at least one triggering condition, handing off the wireless client from the first wireless access point to a second wireless access point of the plurality of wireless access points to create a second wireless connection between the wireless client and the second wireless access point.

2. The method of claim 1, wherein the method is performed by the wireless client.

3. The method of claim 1, wherein the actively scanning using an adaptive scanning interval further comprises acts of:
   a1) the wireless client switching to a new channel other than a channel of the first wireless access point;
   a2) the wireless client detecting wireless access points on the new channel;
   a3) the wireless client switching back to the channel of the first wireless access point;
   a4) after the adjusted channel scanning time interval, repeating acts (a1) through (a3).

4. The method of claim 1, wherein the first set of at least one triggering condition and the second set of at least one triggering condition each depends on a plurality of indicators detected by the wireless client.

5. The method of claim 4, wherein the plurality of indicators includes two or more of the Received Signal Strength Indicator, a number of retransmitted packets, a loss of beacons, an uplink bitrate, and a downlink bitrate.

6. The method of claim 4, wherein the first set of at least one triggering condition uses different indicators than does the second set of at least one triggering condition.

7. The method of claim 1, wherein an association delay incurred by the handing off is less than one second.

8. The method of claim 1, wherein an association delay incurred by the handing off is less than 500 ms.

9. The method of claim 1, wherein an association delay incurred by the handing off is less than 50 ms.

10. The method of claim 1, wherein an association delay incurred by the handing off is less than 10 ms.

11. The method of claim 1, wherein the measure of connectivity is a Received Signal Strength Indicator as defined by IEEE or an adapted transmission rate.

12. A wireless client comprising:
   at least one processor programmed to implement:
   a scanning module that initiates active scanning using an adaptive scanning interval for access points in response to a first set of at least one triggering condition, the first set of at least one triggering condition depending on a property of a first wireless connection between the wireless client and a first wireless access point, wherein the first wireless access point has a service set identifier (SSID), and the active scanning using an adaptive scanning interval comprises:
   maintaining a priority scan channel list, wherein each channel in the priority scan channel list contains an access point that has the SSID of the first wireless access point,
   actively scanning each channel in the priority scan channel list by broadcasting a probing request frame before waiting for at least one response to the probing request frame from wireless access points in the channel, and
   after a channel scanning time interval, actively scanning each channel in the priority scan channel list a second time, where the channel scanning time interval is determined based on a measure of connectivity; and
   a handoff module that when in operation hands off the wireless client from the first wireless access point to a second wireless access point in response to a second set of at least one triggering condition, wherein handing off the wireless client comprises disconnecting the wireless client from the first wireless access point and forming a second wireless connection between the wireless client and the second wireless access point, wherein the first set of at least one triggering condition differs from the second set of at least one triggering condition.

13. The client of claim 12, further comprising a network interface card and a software driver for the network interface card, wherein the scanning module and the handoff module are implemented by the software driver.

14. The client of claim 12, wherein the scanning module and the handoff module are implemented in hardware in the wireless client.

15. The client of claim 12, wherein the wireless client is a personal digital assistant, a cell phone, or a laptop computer.

16. The client of claim 12, wherein the wireless client communicates using a protocol that is compliant with one or more of the following IEEE standards: 802.11(a), 802.11(b), 802.11(g), 802.11(n).

17. A non-transitory computer-readable storage apparatus having computer-executable instructions stored thereon that, as a result of being executed by a device, instruct the device to perform a method comprising:
   forming a first wireless connection between the device and a first wireless access point;
   actively scanning using an adaptive scanning interval to detect access points in response to a first set of at least one indicator of connectivity with the first access point, the first set of at least one indicator of connectivity depending on a property of the first wireless connection between the device and the first access point, wherein the first wireless access point has a service set identifier (SSID), and actively scanning using an adaptive scanning interval comprises:
   maintaining a priority scan channel list, wherein each channel in the priority scan channel list contains an access point that has the SSID of the first wireless access point,
   actively scanning each channel in the priority scan channel list by broadcasting a probing request frame before waiting for at least one response to the probing request frame from wireless access points in the channel, and
   after a channel scanning time interval, actively scanning each channel in the priority scan channel list a second time, where the channel scanning time interval is determined based on a measure of connectivity; and
   handing off the device from the first access point to a second access point in response to a second set of at least one indicator of connectivity with the first access point, wherein handing off the device comprises disconnecting the device from the first access point and forming a second wireless connection between the device and the second access point.

18. The non-transitory computer-readable storage apparatus of claim 17, wherein the associating with a second access point is completed in less than one second.

* * * * *